United States Patent [19]

Atwood

[11] Patent Number: 4,738,780

[45] Date of Patent: Apr. 19, 1988

[54] METHOD FOR REPLACING PCB-CONTAINING COOLANTS IN ELECTRICAL INDUCTION APPARATUS WITH SUBSTANTIALLY PCB-FREE DIELECTRIC COOLANTS

[75] Inventor: Gilbert R. Atwood, Briarcliff Manor, N.Y.

[73] Assignee: Union Carbide Corporation, Danbury, Conn.

[21] Appl. No.: 742,962

[22] Filed: Jun. 10, 1985

Related U.S. Application Data

[63] Continuation-in-part of Ser. No. 675,280, Nov. 27, 1984, abandoned.

[51] Int. Cl.[4] .......... B01D 11/04

[52] U.S. Cl. .......... 210/634; 210/909

[58] Field of Search .......... 210/634, 909, 737, 774; 570/211; 556/450, 400; 208/262

[56] References Cited

U.S. PATENT DOCUMENTS

| | | | |
|---|---|---|---|
| 1,702,702 | 2/1929 | Osborne | 210/634 X |
| 1,751,053 | 3/1930 | Osborne | 210/634 X |
| 1,969,235 | 8/1934 | Pew, Jr. et al. | 23/242 |
| 2,043,347 | 5/1936 | Mackenzie | 87/5 |
| 2,582,200 | 1/1952 | Hartzog | 252/64 |
| 2,600,221 | 6/1952 | Domingo | 250/71 |
| 4,124,834 | 11/1978 | Walsh | 336/58 |
| 4,146,491 | 3/1979 | Vincent | 252/63.7 |
| 4,299,704 | 11/1981 | Foss | 210/909 X |

FOREIGN PATENT DOCUMENTS

| | | | |
|---|---|---|---|
| 0023111 | 7/1980 | European Pat. Off. | 210/634 |
| 1540131 | 3/1976 | United Kingdom | 210/634 |
| 1589433 | 6/1977 | United Kingdom | 210/634 |
| 2063908 | 11/1980 | United Kingdom | 210/634 |

OTHER PUBLICATIONS

ASTM D-2283-75, "Standard Specification for Chlorinated Aromatic Hydrocarbons (Askarels) for Transformers", published Aug. 1975.

Robert A. Westin, "Assessment of the Use of Selected Replacement Fluids for PCB's in Electrical Equipment", EPA, NTIS, PB-296377, Mar. 1, 1979.

Y. Iwata, W. E. Westlake, and F. A. Gunther, "Varying Persistence of Polychlorinated Biphenyls in Six California Soils under Laboratory Conditions", *Bull. Envir. Contamination and Toxicology*, 9, 4, 204–211 (1973).

J. Reason and W. Bloomquist, "PCB Replacements: Where the Transformer Industry Stands Now", *Power*, Oct., 1979, pp. 64–65.

R. A. Young and I. O. Lisk, "New Silicone Transformer Fluid: An Environmental Review", *Pollution Eng.*, Aug. 1977, pp. 41–43.

(List continued on next page.)

*Primary Examiner*—Frank Spear

*Attorney, Agent, or Firm*—Paul W. Lewzzi; Saul R. Bresch

[57] ABSTRACT

Method of replacing a PCB-containing coolant in electrical induction apparatus having a vessel containing said PCB-containing coolant, an electrical winding and porous solid cellulosic electrical insulation immersed in, and impregnated with, said PCB-containing coolant with a substantially PCB-free high boiling dielectric permanent coolant into which any residual PCBs elute at no greater than a selected target rate comprising steps of (a) draining the PCB-containing coolant from the vessel, (b) filling the vessel with an interim dielectric coolant, (c) electrically operating the apparatus, (d) removing interim coolant containing eluted PCB, (e) repeating steps (b), (c) and (d) a sufficient number of times until the PCB elution rate does not exceed 5 times a selected target rate, (f) filling the vessel with PCB-free high boiling dielectric silicone oil as coolant, (g) electrically operating the apparatus, (h) thereafter removing the silicone oil coolant containing eluted PCB, (i) repeating steps (f), (g) and (h) a sufficient number of times until the PCB elution rate into the silicone oil is less than the selected target rate, and refilling the vessel with a substantially PCB-free dielectric cooling liquid.

22 Claims, 3 Drawing Sheets

OTHER PUBLICATIONS

Figure 1:
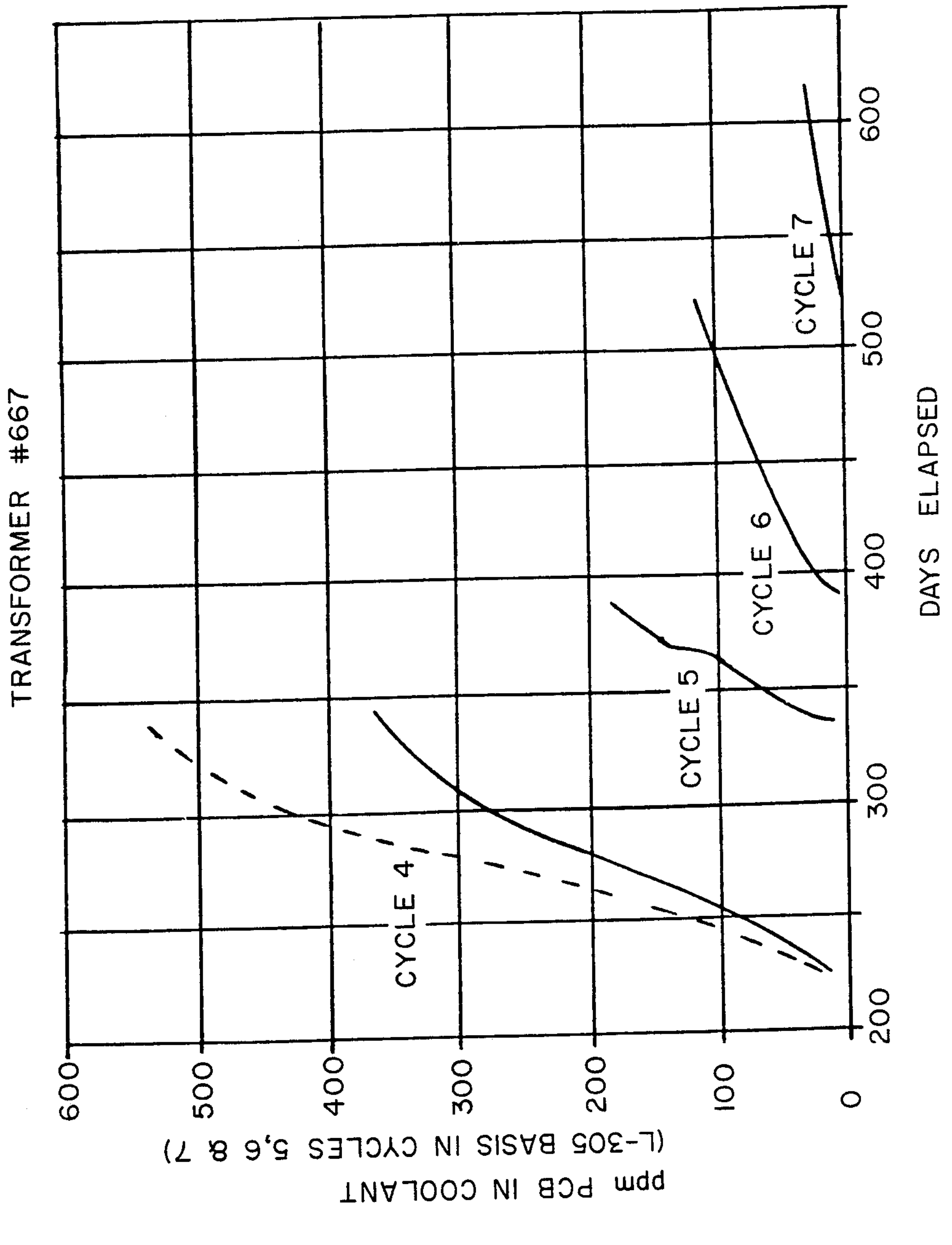

R. E. Miller, "Silicone Transformer Liquid: Use Maintenance and Safety", Conf. Rec. IAS 14th Annual Meeting, Sep. 30–Oct. 5, 1979, IEEE Cat. #97CH1484–51A, pp. 1047–52.

C. Hosticka, "Insulating Characteristics of Dimethyl Silicone in Bare and Insulated Uniform Field Gaps", *IEEE Trans. Electr. Insul.*, vol. EI-12, #6, Dec. 1977, pp. 389–394.

L. A. Morgan and R. C. Ostoff, "Problems Associated with the Retrofilling of Askarel Transformers", IEEE Power Eng. Soc., Winter Meeting, N.Y., N.Y., Jan. 30–Feb. 4, 1977, pap. A77, p. 120–9.

"The RetroSil PCB Removal System", promotional literature of Dow Corning Corp., #10-205-82 (1982).

Trade literature of Positive Technologies, Inc., on the Zero/PC/Forty process.

Jacqueline Cox, "Silicone Transformer Fluid from Dow Reduces PCB Levels to EPA Standards", *Paper Trade Journal*, Sep. 30, 1982.

Richard P. de Filippi, "$CO_2$ as a Solvent: Application to Fats, Oils and Other Materials", *Chem. and Ind.*, Jun. 19, 1982, pp. 390–394.

T. O'Neil and J. J. Kelly, "Silicone Retrofill of Askarel Transformers", *Proc. Elec./Electron. Insul. Conf.*, 13, 167–170 (1977).

W. C. Page and T. Michaud, "Development of Methods to Retrofill Transformers with Silicone Transformer Liquid"; *Proc. Elec./Electron. Insul. Conf.*, 13, 159–166 (1977).

Gilbert Addis and Bentsu Ro, "Equilibrium Study of PCB's Between Transformer Oil and Transformer Solid Materials", EPRI PCB Seminar, Dec. 3, 1981.

J. H. Olmsted, "Transformer Askarel Removal to an EPA Clean Level", IAS79-34C, pp. 1053–1055.

R. H. Parrish and S. D. Myers, "An Update of the Use, Labeling, Handling and Disposal of PCBs", IEEE Cat. #0190-2172/81, pp. 15–24.

Union Carbide Product Information, "An Environmentally Acceptable and Less Flammable Dielectric Fluid for Transformers", 12/81-3M, pp. 1-12.

METHOD FOR REPLACING PCB-CONTAINING COOLANTS IN ELECTRICAL INDUCTION APPARATUS WITH SUBSTANTIALLY PCB-FREE DIELECTRIC COOLANTS

This application is a continuation-in-part application of application Ser. No. 675,280, filed Nov. 27, 1984, now abandoned.

BACKGROUND OF THE INVENTION

1. Field Of The Invention

This invention relates to electrical induction apparatus, e.g. electric power transformers, specifically to the dielectric liquid coolants contained therein and especially to those coolants consisting of or containing as a constituent, polychlorinated biphenyl, PCB. More particularly, the present invention relates to methods for converting PCB-containing electrical induction apparatus, e.g. transformers, into substantially PCB-free transformers in order to qualify said transformers as "non-PCB" transformers under U.S. government regulations.

2. Prior Art

Because of their fire resistance, chemical and thermal stability, and good dielectric properties, PCB's have been found to be excellent transformer coolants. U.S. Pat. No. 2,582,200 discloses the use of PCB's alone or in admixture with compatible viscosity modifiers, e.g., trichlorobenzene, and such trichlorobenzene-PCB mixtures have been termed generically "askarels". These askarels may also contain minor quantities of additives such as ethyl silicate, epoxy compounds and other materials used as scavengers for halogen decomposition products which may result from potential electric arcing. ASTM D-2283-75 describes several types of askarels and delineates their physical and chemical specifications.

However, PCB's have been cited in the U.S. Toxic Substances Control Act of 1976 as an environmental and physiological hazard, and because of their high chemical stability, they are non-biodegradable. Hence, they will persist in the environment and are even subject to biological magnification (accumulation in higher orders of life through the food chain). Accordingly, in the United States, transformers are no longer made with PCB or askarel fluids. While older units containing PCB may still be used under some circumstances, it is necessary to provide special precautions such as containment dikes and maintain regular inspections. Transformers containing PCB's are at a further disadvantage since maintenance requiring the core to be detanked is prohibited, and the transformer owner remains responsible for all environmental contamination, including clean-up costs, due to leakage, tank rupture, or other spillage of PCB's, or due to toxic by-product emissions resulting from fires. To replace a PCB-containing transformer, it is necessary to (1) remove the transformer from service, (2) drain the PCB and flush the unit in a prescribed manner, (3) remove the unit and replace with a new transformer, and (4) transport the old transformer to an approved landfill for burial (or to a solid waste incinerator). Even then, the owner who contracts to have it buried still owns the transformer and is still responsible (liable) for any future pollution problems caused by it. Liquid wastes generated during replacement must be incinerated at special approved sites. Thus replacement of a PCB transformer can be expensive, but more importantly, since most pure PCB or askarel transformers are indoors, in building basements or in special enclosed vaults with limited access, it may not be physically feasible to remove or install a transformer, nor would it be desirable from an asset management perspective.

A desired approach to the problem would be to replace the PCB oil with an innocuous, compatible fluid. A number of fluid types have been used in new transformers as reported in Robert A. Westin, "Assessment of the Use of Selected Replacement Fluids for PCB's in Electrical Equipment", EPA, NTIS, PB-296377, Mar. 1, 1979; J. Reason and W. Bloomquist, "PCB Replacements: Where the Transformer Industry Stands Now", *Power,* October, 1979, p. 64–65; Harry R. Sheppard, "PCB Replacement in Transformers", *Proc. of the Am. Power Conf.,* 1977, pp. 1062–68; *Chem. Week,* 130, 3, 24 (1/20/82); A. Kaufman, *Chem. Week,* 130, 9, 5 (3/3/82); *CMR Chem. Bus.,* Oct. 20, 1980, p. 26; *Chem. Eng.,* July 18, 1977, p. 57; Belgian Pat. No. 893,389; *Europ. Plastic News* June, 1978, p. 56. Among these are silicone oils, e.g., polydimethylsiloxane oils, modified hydrocarbons (for high flash points, e.g. RTEmp, a proprietary fluid of RTE Corp.), synthetic hydrocarbons (poly-alpha-olefins), high viscosity esters, (e.g. dioctyl phthalate and PAO-13-C, a proprietary fluid of Uniroyal Corp.), and phosphate esters. A number of halogenated alkyl and aryl compounds have been used. Among them are the liquid trichloro- and tetrachlorobenzenes and toluenes and proprietary mixtures thereof (e.g., liquid mixtures of tetrachlorodiarylmethane with trichlorotoluene isomers). Liquid mixtures of the trichloro- and tetrachlorobenzene isomers are particularly suitable because of their low flammabilities (e.g., high fire points) and similar physical and chemical properties to askarels being removed. Other proposed fluids are tetrachloroethylene (e.g. Diamond Shamrock's Perclene TG) and polyols and other esters.

Of all the non-PCB fluids, silicone oils have been the most widely accepted. Their chemical, physical, and electrical properties are excellent. They have high fire points (>300° C.), and no known toxic or environmental problems These oils are trimethylsilyl end-blocked poly(dimethylsiloxanes) of the formula:

$$(CH_3)_3SiO[(CH_3)_2SiO]_nSi(CH_3)_3$$

wherein n is of a value sufficient to provide the desired viscosity (e.g., a viscosity at 25° C. of about 50 centistokes). Commercial silicone oils suitable for use are available from Union Carbide (L-305), and others. In addition, U.S. Pat. No. 4,146,491, British Pat. Nos. 1,540,138 and 1,589,433 disclose mixtures of silicone oils with a variety of additives to improve electrical performance in capacitors, transformers and similar electrical equipment, and disclose polysiloxanes with alkyl and aryl groups other than methyl.

Replacement of PCB-containing askarels in older transformers with silicone oils or one of the other substitute fluids would seem to be a simple matter, but it is not. A typical transformer contains a great deal of cellulosic insulating material to prevent electrical coils, etc., from improper contact and electrical arcing. This material is naturally soaked with askarel, and may contain from 3 to 12% of the total fluid volume of the transformer. This absorbed askarel will not drain out, nor can it be flushed out by any known means, however efficient. Once the original bulk askarel is replaced with a fresh non-PCB fluid, the slow process of diffusion permits the old absorbed askarel to gradually leach out, and the PCB content of the new fluid will rise. Thus, the new coolant becomes contaminated.

For purposes of classification of transformers, the U.S. government regulation has designated those fluids with greater than 500 ppm PCB as "PCB transformers", those with 50–500 ppm PCB as "PCB contaminated transformers", and those with less than 50 ppm PCB as "non-PCB transformers". While major expenses may be entailed with the first two classifications in the event of a spill or the necessity of disposal, the last category is free of U.S. government regulation. To achieve the last classification, the PCB concentration must remain below 50 ppm for at least 90 days, with the transformer in service and sufficiently energized that temperatures of 50° C. or higher are realized. This requires a 90-day averaged rate of elution of 0.56 ppm/day. It is anticipated that most, if not all, states of the United States will adopt regulations which may be the same as, or stricter, than U.S. government regulations. More lenient regulations may be possible elsewhere.

There are a number of commercial retrofill procedures on the market including those described in "The RetroSil PCB Removal System", Promotional literature of Dow Corning Corp., #10-205-82 (1982), and trade literature of Positive Technologies, Inc. on the Zero/PC/Forty process. These utilize initial clean-out procedures of as high efficiency a possible during which the electrical apparatus is not in operation. Most include a series of flushes with liquids such as fuel oil, ethylene glycol, or a number of chlorinated aliphatic or aromatic compounds. Trichloroethylene is a favorite flush fluid. Some processes, such as the Positive Technologies, Inc. Zero/PC/Forty process use a fluorocarbon vapor scrub alternating with the liquid flushes. When the initial clean-out procedure is complete, the transformer is filled with silicone fluid. As effective as these elaborate flushing procedures might have been expected to be, they cannot remove PCB adsorbed into the interstices of the cellulosic material. Consequently, the PCB content of the silicone coolant gradually rises as the residual PCB leaches out while the transformer is in use. Therefore, if one wishes to reach a PCB-free state ("non-PCB" as defined by U.S. government regulations), it is necessary to either periodically change-out, or continually clean up, the silicone fluid until a leach rate of less than 50 ppm for 90 days is reached.

Periodic change-out is very expensive, and because both the silicone and PCB are essentially non-volatile, distillation to separate them is not practicable and other methods of separation are expensive or ineffective. Dow Corning in its RetroSil process uses a continual carbon filtration to clean up the fluid ("The RetroSil PCB Removal System", Promotional literature of Dow Corning Corp., #10-205-82 (1982); Jacqueline Cox, "Silicone Transformer Fluid from Dow Reduces PCB Levels to EPA Standards", *Paper Trade Journal,* Sept. 30, 1982; T. O'Neil and J. J. Kelly, "Silicone Retrofill of Askarel Transformers", *Proc. Elec./Electron. Insul. Conf.,* 13, 167–170 (1977); W. C. Page and T. Michaud, "Development of Methods to Retrofill Transformers with Silicone Transformer Liquid", *Proc. Elec./Electron. Insul. Conf.,* 13, 159–166 (1977)). Westinghouse in U.S. Pat. No. 4,124,834 has patented a transformer with a filtration process for removing PCB from the coolant, while RTE in European Pat. No. 0023111 has described the use of chlorinated polymers as an adsorbing media. However, the filters used in these processes are very expensive and the removal of PCB is very ineffective, due both to lack of selectivity and the very low concentrations of PCB being filtered. In lieu of filtration, procedures have been proposed involving decantation (U.S. Pat. No. 4,299,704) which is impractical due to solubility limitations, and only good at high concentrations; extraction with polyglycols (F. J. Iaconianni, A. J. Saggiomo and S. W. Osborn, "PCB Removal from Transformer Oil", EPRI PCB Seminar, Dallas, Tex., Dec. 3, 1981) or with supercritical $CO_2$ (Richard P. deFilippi, "$CO_2$ as a Solvent: Application to Fats, Oils and Other Materials", *Chem. and Ind.,* June 19, 1982, pp. 390–94), and chemical destruction of the PCB's with sodium (British Pat. No. 2,063,908). None of these schemes have been found to be economically or commercially practical for askarel transformers. However, the filtration scheme could be a reasonably effective, though expensive, procedure if it were not for the fact that the leach rate is so slow that it could take many years to reduce the residual PCB to a point where the final leach is reduced to an acceptable value (Gilbert Addis and Bentsu Ro, "Equilibrium Study of PCB's Between Transformer Oil and Transformer Solid Materials", EPRI PCB Seminar, Dec. 3, 1981).

The problem and its cause are discussed in L. A. Morgan and R. C. Ostoff, "Problems Associated with the Retrofilling of Askarel Transformers", IEEE Power Eng. Soc., Winter Meeting, N.Y., N.Y., Jan. 30–Feb. 4, 1977, pap. A77, p. 120–9. The solubility of a typical silicone oil in PCB is practically nil ($<0.5\%$) at temperatures up to and over 100° C., while the solubility of PCB in the silicone ranges from only 10% at 25° C. to 12% at 100° C. While this limited solubility does not restrict the bulk silicone from dissolving the available free PCB, it does restrict the ability of the PCB to diffuse from the pores or interstices of the cellulosic matter.

Within any given pore filled with PCB-containing coolant, diffusion of PCB out must be accompanied by diffusion of silicone in. At some point within the pore there must exist an interface between the PCB-containing coolant and the silicone, across which neither material can very rapidly diffuse. Because the PCB is more soluble in the silicone than the reverse, the PCB will slowly diffuse into the silicone while the interface advances gradually into the pore. The limited solubility restricts the rate of diffusion and while this mechanism might eventually clean the pore of PCB, it is orders of magnitude slower than if the silicone and PCB were miscible. The high viscosity of the silicone (and many other coolants) is also an inhibiting factor. The result is a long drawn-out leach period of perhaps several years, during which the silicone must be continually filtered or periodically replaced to remove PCB's from it. Thus, the slow leaching of PCB's out of the solid insulation by the silicone is worse than no leaching at all since the dangers of a spill of PCB-containing materials will persist over a period of years Experimental studies by Morgan and Osthoff showed, for example, that effective PCB diffusivities into a typical silicone oil were only 1/10 of those into a 10 centistoke hydrocarbon oil. Although one might prefer, then, to retrofill with such a hydrocarbon oil, if it were not for the fire hazard of hydrocarbons, there still also is the problem of separating the PCB from the contaminated hydrocarbon oil which is high boiling like the PCB and like the silicone oil.

More importantly, undiluted PCBs are highly viscous and thus relatively immobile. Askarels contain PCB dissolved in "TCB" (trichlorobenzene) or mixtures of TCB and "TTCB" (tetrachlorobenzene) which thins out or reduces the viscosity of the PCB. TCB is much more soluble in silicone than is PCB and, therefore, TCB is removed from the askarel residing within the interstice of the insulation leaving highly viscous PCB (with or without small amounts of diluents, TCB or mixtures) within the interstices. Consequently, treatments with silicone (e.g. as in the Dow RetroSil system), without prior treatment according to this invention, are counter-productive and render the PCB remaining in th interstices even more difficult to remove. This can explain the lack of commercial success of prior systems in reclassifying transformers to a "non-PCB" status.

SUMMARY OF THE INVENTION

The present invention is based upon the unexpected finding that dielectric silicone oils can and do elute PCB from the internal insulation of electrical apparatus at an unexpectedly high rate, provided that the coolant in the transformer is first replaced with a relatively low viscosity interim coolant that is miscible with PCB, for example, TCB or mixtures thereof with TTCB. The subsequent rate of elution of PCB into silicone oil coolant, when practicing the present invention, was found to be surprisingly high and approximates or comes close to approximating the rates of elution of PCB into relatively low viscosity interim coolants such as TCB or mixtures thereof with PCB.

No prior art has been found to disclose the concept of the present invention which involves first using a relatively low viscosity interim coolant substantially free of PCBs as a combined coolant and eluant during electrical operation of a transformer or other electrical apparatus followed by the use of a dielectric ilicone oil as a combined PCB-eluant-coolant during subsequent electrical operation of the transformer before changing over to the permanent silicone oil coolant. Much less is there any prior art suggesting that a silicone oil coolant becomes, after the interim coolant treatment, a relatively efficient eluant for PCB's.

The present invention, more particularly, involves a suitable temporary or interim leaching-cooling liquid (readily miscible with PCB and having a relatively low viscosity) as a substitute for PCB-containing coolants in electrical induction apparatus, e.g. transformers, having a vessel containing the coolant and an electrical winding with porous solid cellulosic electrical insulation immersed in and impregnated with PCB while electrically operating the transformer for a sufficient period of time to elute PCB from the solid electrical insulation contained in the transformer. During the period of interim operation, the interim dielectric cooling liquid can be changed to speed up the elution process; the interim goal being to achieve a rate of elution of PCB into said interim coolant which is not more than 5 times the selected target rate, preferably not more than 3 times the selected target rate, and more preferably not more than 2 times the selected target rate. In terms of U.S. government regulations for obtaining a "non-PCB" transformer, the interim goal is to achieve a rate of elution of PCB into said interim coolant not greater than 3 ppm PCB per day and preferably in the range of 0.6 to 3 ppm PCB per day based on silicone oil dielectric to be used as permanent coolant [e.g., 0.4 to 5 ppm PCB per day based on the weight of interim coolant when said interim coolant is "TCB mix" (a mixture of 65–70 wt. % of trichlorobenzene and 35–30 wt. % of tetrachlorobenzene)]. The difference in density (grams per cubic centimeter at 25° C.) of TCB mix (1.492) and silicone oil (0.975 for L-305) accounts for the differences in the PCB elution rate figures depending upon the eluant basis, e.g. TCB mix basis or silicone oil basis, because the elution rates are expressed in ppm which is on a weight basis, the volume of eluants or coolants in the transformer being constant. Since the density of TCB mix is 1.51 times the density of silicone oil the rate of elution based on silicone oil is 1.51 times the rate of elution based on TCB mix. In order to meet the U.S. government requirement for non-PCB transformers, the ultimate selected target rate of elution would have to average below 0.55 ppm PCB per day, based on the weight of the silicone oil dielectric, in order for the PCB content of the silicone oil coolant in the transformer to remain below 50 ppm over a 90 day period. The ultimate selected target rate of elution can be lower or higher depending upon the regulations of the particular jurisdiction in which the transformer being treated is located. There may be some jurisdictions outside the United States which have no regulations concerning PCB content, in which case the transformer owner may select a target rate to reduce potential liability in the event of a transformer spill. After the amount of leachable PCB in the transformer has been reduced to the desired degree, the interim dielectric cooling liquid is removed from the vessel and the vessel is then filled with a PCB-free dielectric silicone oil cooling liquid compatible with the transformer. The transformer is then operated until the rate of elution of PCB into the silicone oil coolant is less than the selected target rate of elution. The dielectric silicone oil coolant can be changed over to fresh dielectric silicone oil coolant as many times as is necessary or desirable in order to achieve less than the selected target rate of elution. After a rate less than the selected target rate is reached, the transformer is reclassified as a non-PCB transformer. As an important part of the present invention, the resulting transformer contains silicone oil coolant which is not only substantially free of PCB but which is also substantially free of TCB or TTCB.

The following describes a procedure according to this invention by which a PCB fluid in a transformer is replaced with a permanent PCB-free liquid coolant:

(1) The transformer is deenergized and the PCB-containing fluid drained and disposed of in accordance with environmentally acceptable procedures. The transformer may be flushed with a flushing fluid, e.g., trichlorobenzene or trichloroethylene, liquid or vapor, to remove "free" PCB fluid.

(2) The transformer is filled with a temporary or interim cooling fluid, such as, trichlorobenzene, TCB, or a mixture thereof with tetrachlorobenzene, which is miscible with or dissolves PCB and is capable of penetrating into the pores of the electrical insulation and which is also capable of being readily separated from the PCB, and electrical operation is restored.

(3) The fluid temperature is monitored, and if the electrical loading of the transformer does not provid sufficient fluid temperature to provide the desired rate of PCB elution, thermal lagging or even external heating can be provided. Circulation of the fluid through an external loop and pump for the purpose of heating same, cr for augmenting the internal circulation, may also be provided.

(4) The rate of PCB elution into the interim cooling fluid can be determined by periodic sampling and analysis. The accumulated PCB is periodically removed by removing the interim cooling fluid containing the PCB and distillation of the interim cooling fluid, e.g., trichlorobenzene (TCB) from the PCB. This may be done by deenergizing the transformer, draining the old fluid for distillation, and replacing with fresh interim cooling fluid, e.g., TCB. Alternatively, the transformer may be left operational while fresh interim cooling fluid, e.g., TCB, is added and old TCB removed via a slip stream or circulation loop.

(5) The PCB-contaminated TCB fluid is distilled to provide an essentially PCB-free TCB distillate, and a bottom product of PCB contaminated with TCB. The PCB may be disposed of according to approved U.S. government procedures, e.g., by incineration.

(6) When the elution rate of PCB into the interim coolant reaches the desired level, e.g. a rate in the range of 0.4 to 2.0 ppm of PCB per day based on the weight of said interim coolant when it is TCB mix, the transformer is deenergized, drained, and filled with the dielectric silicone oil compatible with the transformer. it is then returned to service.

(7) The transformer is then placed back in electrical operation which is continued until the elution rate drops below the selected target elution rate. If it does not, the PCB contaminated silicone oil is removed and replaced with fresh silicone oil and the electrical operation is continued. The silicone oil temperature is monitored and, if the electrical loading of the transformer does not provide sufficiently high fluid temperature (e.g., above 50° C.) to provide a desired high rate of PCB elution, thermal lagging or even external heating can be provided. Circulation of the silicone oil through an external loop and pump for the purpose of heating same and augmenting internal circulation may also be provided.

(8) The transformer is electrically operated, with or without silicone oil changeovers, until the elution rate drops below the selected target elution rate.

(9) In order to meet U.S. government regulations for "non-PCB" transformers, an analysis at the end of 90 days should show a PCB concentration of less than 50 ppm after which the transformer is reclassified as "non-PCB".

FIG. 1 contains plots of concentrations, ppm, of PCB in an interim dielectric fluid (TCB mix) during the fourth leach cycle, in the silicone oil during cycles 5, 6 and 7 in an actual transformer with concentrations plotted on the vertical scale vs. days elapsed (or soak time) on the horizontal scale. (TCB mix was used in the first three cycles). The figure graphically illustrates the surprising results obtained by this invention. The rate of elution of PCB by the silicone oil resulting from the application of the present invention is unexpectedly high.

Figure 2:
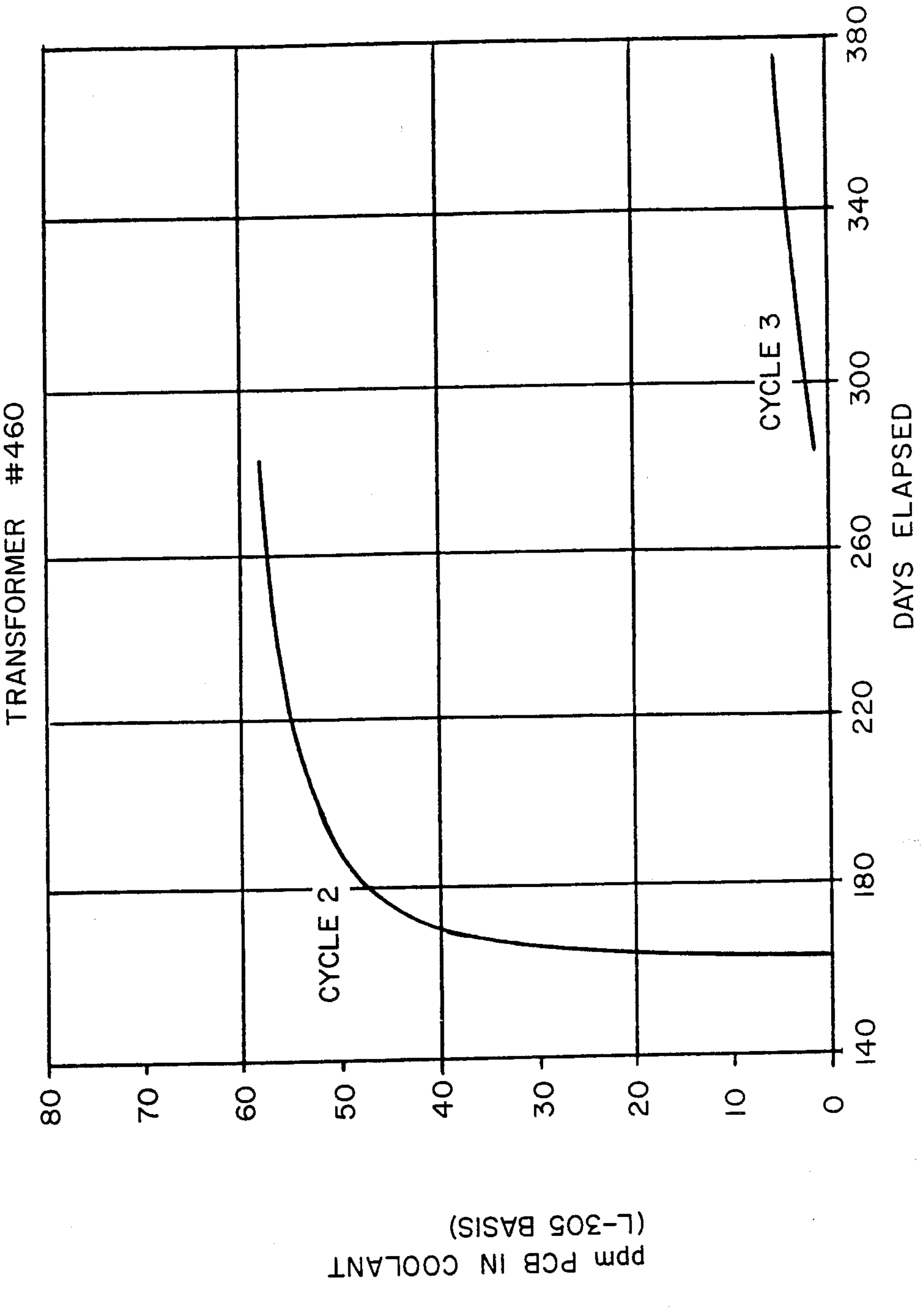

FIG. 2 contains plots of concentrations, ppm, of PCB in the silicone oil during cycles 2 and 3 in an actual transformer with concentrations plotted on the vertical scale versus days elapsed on the horizontal scale.

Figure 3:
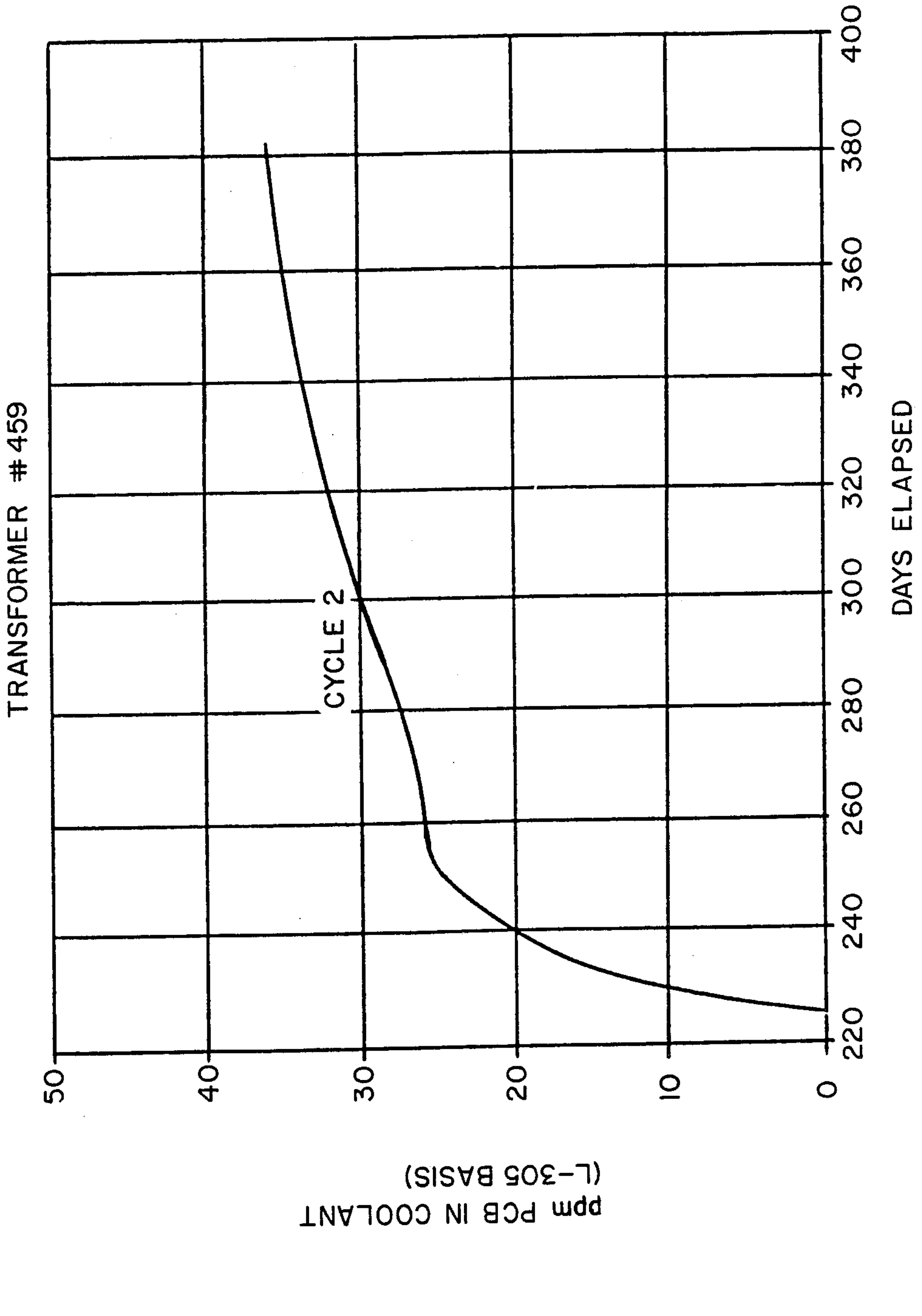

FIG. 3 contains plots of concentrations, ppm, of PCB in the silicone oil during cycle 2 in an actual transformer with concentrations plotted on the vertical scale versus days elapsed on the horizontal scale.

The selected target rate of elution of PCB into silicone oil coolant is 0.56 ppm of PCB per day based on the weight of silicone oil coolant when it is desired to provide less than 50 ppm PCB elution for a 90 day period. In order to take advantage of the rapidness of elution of PCB by the silicone oil as illustrated by Cycle 5 in the figure without sustaining the relatively lower elution rate by the silicone oil as shown in the latter stages of Cycle 6, it is preferred that the changeover from interim coolant to the silicone oil coolant be made after the elution rate into the interim coolant drops below three times the selected target rate of elution. More preferably, the changeover is made when the rate of elution of PCB into the interim coolant drops below 2.5 times the selected target rate of elution. Still more preferably, the changeover is made when the elution rate into the interim coolant drops below about 2 times the selected target rate of elution.

With respect to the flushing step, while efficient draining and flushing techniques should be used, these do not in themselves constitute the invention, but are a part of all heretofore known retrofill procedures. They are a prelude to the most efficient embodiment of the invention itself, but their value heretofore has been overrated, in that it is the slow leach rate, not the efficiency of flush which has been found to limit the rate of PCB removal. A wide variety of solvents may be used in the flushing step, including hydrocarbons such as gasoline, kerosene, mineral oil or mineral spirits, toluene, turpentine, or xylene, a wide range of chlorinated aliphatic or aromatic hydrocarbons, alcohols, esters, ketones, and so forth. However, from materials handling standpoint and PCB separation logistics, it is practical to avoid using any more chemical types than necessary, so that the use of the intended temporary leach fluid, e.g., TCB or mixtures thereof with tetrachlorobenzene, as the initial flush is most practical.

Interim dielectric cooling fluids other than normally liquid trichlorobenzene, TCB, or a mixture thereof with tetrachlorobenzene, can be used. The preferred interim fluid has the following characteristics: (a) it is compatible with PCB (i.e. preferably dissolving at least 50% of its weight of PCB, more preferably, at least 90% of its weight of PCB and, most preferably, being miscible in all proportions with PCB), and is compatible with the silicone oil; (b) it is of low enough molecular weight to have good molecular mobility to be able to enter the pores or interstices of the solid insulating material and it promotes rapid mutual diffusion, preferably, having a viscosity at 25° C. of 10 centistokes or less and, more preferably, 3 centistokes, or less,; (c) it can be easily separated (e.g., by distillation) from PCB and it preferably, has a boiling point of 275° C. or less and, more preferably, 260° C. or less from PCB; (d) it is presently considered environmentally innocuous; and (e) it is compatible with typical transformer internals. While TCB, or mixtures with tetrachlorobenzene, is preferred, a number of alternatives, as above-mentioned can be used. These would include modified and synthetic hydrocarbons, and a variety of halogenated aromatic and aliphatic compounds. There are also a variety of liquid trichlorobenzene isomer mixtures. The preferred TCB fluid would be a mixture of these isomers with or without tetrachlorobenzene isomers. The advantage lies in the fact that such a mixture has a lower freezing point than do the individual isomers, thus reducing the chance of it solidifying within the transformers in very cold climates. Further, the mixtures are often the normal result of manufacture and hence can cost less than the separated and purified individual isomers.

However, any solvent in which PCB is soluble can be used for flushing and as an interim dielectric cooling liquid for the leaching of PCB contained in a transformer. Chlorinated solvents such as trichloroethylene, trichloroethane, tetrachloroethylene, tetrachloroethane, chlorinated toluenes, chlorinated xylenes, liquid trichlorobenzene and its isomers and mixtures, and liquid tetrachlorobenzene and its isomers and mixtures are suitable. Hydrocarbon solvents such as gasoline, kerosene, mineral oil, mineral spirits, toluene, turpentine and xylene can also be used but may be considered to be too flammable for safe use. Particularly suitable solvents are the trichlorobenzenes and tetrachlorobenzenes because of their low flammability characteristics, their high PCB compatibility and their ability to circulate throughout the transformer vessel and into the pores or interstices of the solid insulating material.

Because the preferred objective here is to leach out the PCB at the fastest practical rate, the preferred embodiment involves operating the transformer to obtain the fastest possible diffusion rates of PCB into the interim coolant pursuant to step (3) above and into the dielectric silicone oil pursuant to step (7) above. When used at its full rated loading, a transformer should automatically provide enough heat for this purpose. However, since many transformers are operated below their rated loading and below their rated safe temperature (usually 70° C. to 110° C.), sufficiently elevated temperatures (e.g., at least 50° C.) might not be achieved without thermal lagging or external heating. While this thermal control represents a preferred embodiment of this invention, it is optional and not an essential requirement, there being many transformers for which such lagging or heating may be impractical. reaching at lower temperatures, even ambient, is workable but will take longer.

Fluid circulation as specified in steps (3) and (7) is optional but is an advantageous embodiment in that such circulation will prevent the build-up of concentration gradients which can act to retard diffusion. Since elution is a slow process, the circulation rate need not be very rapid. Violent circulation, of course, is to be avoided in order to avoid damage to the internal structure of the transformer. It is recognized that many transformers may not, by their construction or placement, be readily modified to utilize a circulation loop, and such circulation is not considered a necessary aspect, but only one embodiment of this invention to increase elution rates. In most transformers, natural thermal gradients alone will induce sufficient circulation especially in those cases where a relatively low viscosity, mobile coolant, such as TCB, is used.

As the PCB content in the TCB or other interim coolant or in the silicone oil dielectric coolant in the transformer builds up, it can eventually reach a point where diffusion no longer serves to leach PCB from the cellulosic pores or interstices of the insulation within the transformer tank. A reduction in elution rate as determined by sample analysis, is a clue that this may be occurring. If it is determined that this is occurring, it may become necessary as specified in steps (4) and (7) to replace the PCB-laden interim dielectric cooling fluid or the dielectric silicone oil with fresh PCB-free fluid or oil. This is most easily accomplished by deenergizing the transformer, draining out the contaminated leach fluid (interim dielectric coolant or silicone oil), and replacing it with fresh fluid or oil. As a practical matter, instead of monitoring the elution rate to determine when diffusion no longer serves to effectively leach PCB from the pores or interstices of the electrical insulation, it is more practical to schedule the transformer for regular coolant changes. If a non-PCB transformer is desired, coolant changes are made after selected periods of electrical operation until the coolant elutes less than 50 ppm of PCB (on silicone oil coolant basis) after 90 days operation. Periods of electrical operation between coolant changes can be selected to be 20 days to 1 year (or more, if the transformer owner's needs prevent shutting down the transformer except at rare specified times, e.g., special holiday periods, such that there may be more than one year between shutdowns, and possibly shutdowns can take place only every other year), preferably 30 to 120 days and most preferably 45 to 90 days.

The contaminated leach fluid may then be distilled off and condensed for re-use to leave a PCB bottom product which is incinerated or otherwise disposed of pursuant to U.S. government regulations. While a complete change of interim coolant is preferred, it is possible that the inconvenience of additional shutdowns predicates a different procedure, i.e., that of simultaneously introducing new fresh fluid and removing the old contaminated fluid while the transformer remains in operation. Similarly, PCB-laden silicone oil can be removed continuously from the transformer while simultaneously continuously introducing fresh PCB-free silicone oil. It is less efficient because the fresh fluid or oil mixes with the old in the transformer, and fluid or oil of reduced PCB concentration is actually removed. Thus to eliminate all the PCB, more leach fluid or oil will have to be removed than for the preferred procedure. This penalty can be reduced if one takes pains to avoid excessive mixing. For example, fresh chilled TCB or other interim dielectric cooling fluid can be introduced into the bottom of the transformer, while warm, PCB-laden interim dielectric cooling fluid is removed from the top. The density difference will retard mixing. Similarly, fresh chilled silicone oil (relatively higher density) can be introduced in step (7) into the bottom of the transformer while warm, PCB-laden silicone oil (relatively lower density) is removed from the top. Regardless of the method used, the process will require repetition until the desired PCB level in silicone oil can be maintained.

While distillation is the preferred method for separating TCB or other interim dielectric coolant and PCB, other methods may be feasible, especially if fluid other than TCB is chosen as the temporary fluid. The PCB can be removed from the PCB-laden silicone oil that may result from step (7) by contacting it (e.g. on-site while step (7) is being carried out or off-site after PCB-laden silicone oil has been removed) with activated charcoal, zeolites or other adsorbants capable of adsorbing the PCB from the silicone oil. Any other method for removing PCB from the spent silicone oil can be employed.

There is some concern that TCB itself, or other chlorinated interim dielectric coolant, such as TTCB and other halogenated solvents, may eventually become suspect as a health hazard, and that the transformer should not be contaminated with TCB or other objectionable interim fluid. The further advantage of the procedure of this invention is that the transformer at the conclusion of the method of this invention not only does not contain any objectionable amounts of PCB but also is substantially free of TCB or any other potentially objectionable interim fluid. Accordingly, the interim coolant can be replaced and the old batch sent to a still for purification, and the first charge of silicone oil can be replaced and the old batch sent to an adsorption system for purification.

It is preferred to make the final fill of the transformer with the same silicone oil as was used in the previous leaching-with-silicone oil step, e.g. step (7). Alternatively, other silicone oils can be employed in steps (f) through (j) of the broad scope of this invention and in steps (6) and (8) of the more specific embodiments described hereinabove. Suitable silicone oils have the general formula:

$$(CH_3)_3SiO[(CH_3)_2SiO]_nSi(CH_3)_3 \qquad \text{(Formula A)}$$

wherein n is of a value sufficient to provide the desired viscosity (preferably a viscosity at 25° C. of 20 to 200 centistokes, more preferably a viscosity at 25° C. of 30 to 100 centistokes and most preferably a viscosity at 25° C. of 45 to 75 centistokes).

It is permissible to use other permanent coolants rather than silicone oil in the final fill of the transformer. Other preferred coolants of a permanent nature that can be used in place of the final silicone oil fill include dioctylphthalate, modified hydrocarbon oils, e.g. RTEmp of RTE Corp., polyalphaolefins, e.g. PAO-13-C of Uniroyal, synthetic ester fluids, and any other compatible permanent fluid. It is preferred that the permanent dielectric fluid be characterized by a relatively high boiling point compared to said interim dielectric solvent so that the interim dielectric solvent can be separated from the permanent fluid if the need arises and also to avoid releasing permanent fluid due to volatilization in the event the transformer vessel (e.g., tank) is ruptured.

While the following have been suggested, and in some cases used, as the final fill permanent dielectric fluids, they are less preferred than the relatively high viscosity, high boiling permanent dielectric fluids: tetrachlorodiaryl methane with or without trichlorotoluene isomers, freon, halogenated hydrocarbons, tetrachloroethylene, the trichlorobenzene isomers and the tetrachlorobenzene isomers. The trichlorobenzene isomers, the tetrachlorobenzene isomers, and mixtures thereof have high flammability ratings and other physical properties similar to askarel and therefore are preferred amongst the less preferred permanent fluids.

The following illustrative examples are presented. Each of the examples represents the actual treatment of actual transformers and the data presented in Table 1 constitutes or is based upon data actually obtained during the treatment of these transformers. In the examples, the following abbreviations have been used.

TCB: trichlorobenzene
TTCB: tetrachlorobenzene
TCB mix: 30–35 wt. % tetrachlorobenzene, TTCB, and 70–65 wt. % in trichlorobenzene, TCB (containing an effective amount of a chlorine scavenging epoxide-based inhibitor)
PCB: polychlorinated biphenyls
ppm: parts of PCB or TCB mix per million of coolant based on weight
Askarel: Askarel type A which is 60 wt. % Aroclor 1260 and 40 wt. % TCB
Aroclor 1260: polychlorinated biphenyl (60 wt. % chloride)
L-305: A silicone oil within the scope of Formula (A) above having a viscosity of 50 centistokes at 25° C.

A "cycle" is the period of time between changes in the coolant. A "part" of a cycle is a portion of a cycle where the leach rate into the coolant is markedly different from the rate in the earlier or later portion of the cycle.

EXAMPLES 1, 2, 3, 4, 5 and A

Table 1 gives summary data for six transformers. The transformers for Examples 2, 3 and 4, designated as #460, #461 and #459 respectively, are a bank of three identical Uptegraff transformers of 333 KVA capacity and electrically connected such that the load is equally distributed. Each of these transformers contained about 159 gallons of mineral oil (Exxon Univolt inhibited oil, transformer grade). They had at one time been askarel filled, and subsequently switched to mineral oil; hence contained the residual PCB levels shown in the Table. The transformers for Examples 1, A and 5, designated as #667, #668 and #669 respectively, are a similar bank of three identical transformers of 333 KVA capacity, and similarly connected, but in this case are Westinghouse transformers, and contained about 190 gallons each of Type A askarel (60% Aroclor 1260 and 40% TCB). These transformers were expected to be about the most difficult to leach. They are spiral wound transformers in which the paper insulation, and hence diffusional path length can be several inches in depth. In contrast, many transformers are of the pancake design in which path lengths will be less than an inch. All six transformers were deenergized, drained, then rinsed and refilled with the coolant as shown in the Table for cycle 1. They were reenergized, and during the leaching cycles they were operated normally. Samples of the fluid were taken periodically for analysis, and Table 1 shows the results of these analyses at the ends of parts of the leach cycles. The Table also shows temperatures of the fluid during the leach cycles. The normal load required of these transformers was far below their rated capacity, and thus the normal temperatures of operation were low (50° C. or less). Higher temperatures were achieved by insulating the cooling fins and in some cases wrapping them with heating tapes. Table 2 shows additional detailed data for the later cycles of these transformers, especially those cycles in which L-305 silicone oil was the solvent. In cases where the silicone solvent leached back out TCB or TCB mix, these data also are given in Table 2.

Example 1, #667, illustrates this invention. The transformer was drained of its askarel, rinsed with TCB mix and refilled with TCB mix. The initial leach rate was high, due primarily to residual unrinsed liquor and due to the most easy to leach PCB (i.e., that in course or shallow insulation), while the rate after about fifty days was much lower. Thus, cycle 1 in Table 1 is divided into two parts. The average rate data for cycles 2, 3 and 4 are given in Table 1. While cycle 1 was carried out under ambient conditions, the transformer was heated to 55° C. for cycle 2, and 85° C. for cycles 3 and 4. The average leach rate for cycle 4 was 4.78 ppm/day (on an L-305basis), but because of the curvature of the leach curve, the rate at the end of the cycle was about 2.5 ppm/day, a little less than five times the target leach rate of 0.55 ppm/day for reclassification to non-PCB status. This is illustrated in FIG. 1, which shows the accumulation of PCB in the solvent for cycles 4, 5, 6 and 7. In the case of cycle 4, the solid line represents the analytical results in ppm PCB by weight in the TCB mix, while the dashed line represents the same quantity of PCB converted to an L-305 solvent basis. (For the other cycles with L-305 as the solvent the analytical data are automatically on an L-305 basis.) On the recognition that silicone oil normally leaches askarel at a much slower rate than TCB mix, and consideration of the fact that the transformer had heretofore been artificially heated, it was expected that replacement of the coolant with L-305 silicone oil would give a leach rate which would be low enough for reclassification. It was surprisingly found, however, that such was not the case. Even though the heating had been reduced, the L-305 leached initially faster (6.06 ppm/day) than the TCB mix had done at the end of cycle 4 (2.5 ppm/day), and subsequently to a steady rate (2.38 ppm/day) approximately equal to that at the end of cycle 4. This, too, is shown in FIG. 1. It was recognized that this unexpectedly high rate meant additional PCB would be leached out, which would result in a cleaner transformer, and to hasten this leaching, the transformer was reheated to 85° C. (This reheating coincides with the rapid rise of PCB in coolant around day 370 of cycle 5.) The overall average leach rate in cycle 5 was 3.33 ppm/day. The transformer was redrained and filled with fresh L-305 on day 390. The average rate during cycle 6 was 0.86 ppm/day, and on day 524 the final coolant of fresh L-305 was introduced. The artificial heating was removed, and the transformer was reclassified 91 days later as non-PCB. While three cycles of L-305 were actually used, it would have been possible to combine cycles 5 and 6, so that only one batch of L-305 would have been needed for the "preparatory" leach and hence contaminated with PCB.

While it was recognized that the unexpectedly high leach rate into L-305 would require one or more preparatory L-305 leach cycles, and hence the necessity for a means of separating L-305 and PCB (possibly by adsorption, extraction, or chemical means, e.g., as disclosed in Fessler, U.S. Pat. No. 4,477,354, Oct. 16, 1984), it was also realized that this would allow the removal of most of the TCB mix interim solvent from the transformer. Table 2 gives additional detail on the L-305 cycles, including the TCB mix leached back out. Table 2 shows that the final fill of permanent coolant contains only 0.038% TCB or TTCB, whereas the fifth cycle would have contained 4.5% chlorinated compounds. Table 1 shows also that the PCB level in the TCB mix at the end of cycle four was only 351 ppm (calculated from 530 on an L-305 basis), while at the beginning of cycle 5 the ratio of PCB to TCB mix eluting (Table 2) is 6.06/3375, or the equivalent of 1800 ppm PCB in TCB mix. Thus the high rate could not be explained completely on the basis of residual liquor left from cycle 4. TCB mix with a higher concentration of PCB than the cycle 4 liquor was obviously leaching. It is clear then that having treated the PCB with TCB mix leads to faster leaching by L-305 than would have been expected on the basis of the normal differences in the leachants.

Example A is a contrasting example in which the askarel was not treated with TCB mix prior to leaching with L-305. Transformer #668 was drained of askarel, spray rinsed with L-305 and filled with fresh L-305. At the end of the 392nd day the transformer was again drained, spray rinsed with L-305 , subsequently filled with fresh L-305 , and operated to day 539 in cycle 2. At the end of cycle 2 it was still leaching at about 11.6 ppm/day. The important illustration of this example is that leaching with L-305 alone did not lead to a reduced leach rate in a reasonable period of time. Although the leach rate in the first 28 days of cycle 1 was comparable to the early leach rates for #667 and #669, illustrating the removal of the easily leached portions of the contained PCB, the rate dropped off rapidly for #668, and continued in the 6 to 11 ppm/day range for over 500 days (cycles 1 and 2). Transformers #667 and #669, filled with TCB mix, leached substantially more in the first 96 days than transformer #668, filled with L-305 , did in 392 days. The elution rates in each of transformers #667 and #669 fell because of the gradual depletion of the contained PCB.

Example 2, #460, was drained, rinsed, and refilled with TCB (not the TCB mix). At the end of cycle 1 the PCB leach rate was reduced to 1.02 ppm/day, and it was accordingly drained, rinsed with L-305 , and refilled with L-305. As in the case of #667, the PCB leach rate increased dramatically, extracting much more PCB in the first 10 days than would have been expected by L-305. This is illustrated in FIG. 2. The concentration of TCB also rose dramatically, Table 2, more so than could have been explained by residual undrained liquor alone. By day 283, however, the rate of PCB elution was reduced to only 0.12 ppm/day, and the coolant was drained and replaced by fresh L-305. Ninety-two days into cycle 3 the transformer was reclassified as non-PCB at a PCB level of only 5.5 ppm. The TCB level in the final coolant was only 0.378%.

Example 3, #461, in contrast to Example 2, was leached with two cycles of TCB mix, and was leaching at only 0.24 ppm/day when changed out to L-305. Thus only one cycle of L-305 was required to reclassify to non-PCB status. However, the chlorinated compounds left in the coolant amounted to 4.72%, and if it is desired to remove these, then another L-305 cycle will be required. In this event, it would have been more efficient to have used L-305 for the second cycle and taken advantage of the good leaching quality of L-305 for TCB treated PCB.

Example 4, #459, represents another circumstance where the leach rate was reduced to a very low level before the L-305 was introduced. Consequently it was possible to reclassify with one cycle of L-305 , the final coolant, but at the rather high PCB level of 37 ppm. While the preparatory L-305 leach was not required in this specific case, the transformer did exhibit the abnormal rapid leaching by L-305 of PCB which has been pretreated with an interim solvent, the basis of this invention. This is illustrated in FIG. 3. Example 4 represents the circumstance in which mineral oil was used as the interim solvent, a possibility for those transformers which are not subject to strict fire hazard regulations. Such a transformer would not normally be changed to L-305 , unless a change in location or the rules applicable to that location were anticipated. The final fill of L-305 would be expected to contain several percent of mineral oil from the previous leach cycle, and very likely this would be sufficient to reduce the fire point of the coolant below that required for the specific situation. Hence, an additional refill of L-305 would then likely be required. Thus, mineral oil is a suitable interim solvent for those transformers which are so located that fire is not a critical hazard. It cannot be as easily separated from PCB as is TCB or TCB mix, but chemical methods are available, and solvent extraction, e.g., Fessler, U.S. Pat. No. 4,477,354, Oct. 16, 1984, is also possible.

Example 5, #669, was treated similarly to #667 with the exception that during the second and third cycles it was operated at lower temperatures than #667, and hence lags behind. For this reason, and because of a desire to be closer to the target value of 0.55 ppm/day before changing to the first cycle of L-305 or another final coolant, it is still being leached with TCB mix. Accordingly, at present, it partially illustrates the practice of this invention.

TABLE 1

| Ex. No. | Description | Initial PCB conc. ppm | Solvent (coolant) used | Temp. °C. | Day Interval Start | Day Interval End | PCB conc. at end, ppm (on L-305 basis) | Leach Rate ppm/day (on L-305 basis) |
|---|---|---|---|---|---|---|---|---|
| 1 | Transformer #667 | 600,000 | askarel | | | | | |
| | Cycle 1, 1st part | | TCB mix | var (40) | 0 | 50 | 12,000 | 240.00 |
| | Cycle 1, 2nd part | | TCB mix | var (40) | 50 | 96 | 14,600 | 56.50 |
| | Cycle 2 | | TCB mix | 55 | 96 | 161 | 1,200 | 18.50 |
| | Cycle 3 | | TCB mix | 85 | 161 | 225 | 600 | 9.38 |
| | Cycle 4 | | TCB mix | 85 | 225 | 336 | 530 | 4.78 |
| | Cycle 5 | | L-305 | 40, 85 | 336 | 390 | 180 | 3.33 |
| | Cycle 6 | | L-305 | 85 | 390 | 524 | 115 | 0.86 |
| | Cycle 7 | | L-305 | var to 55 | 524 | 615 | 23 | 0.25 |
| | Reclassified to non-PCB on day 615 | | | | | | | |
| 2 | Transformer #460 | 25,000 | mineral oil | | | | | |
| | Cycle 1, 1st part | | TCB | 85 | 0 | 25 | 750 | 30.00 |
| | Cycle 1, 2nd part | | TCB | 85 | 25 | 162 | 890 | 1.02 |
| | Cycle 2, 1st part | | L-305 | 85 | 163 | 173 | 45 | 4.50 |
| | Cycle 2, 2nd part | | L-305 | 85 | 173 | 283 | 58 | 0.12 |
| | Cycle 3 | | L-305 | var to 55 | 283 | 375 | 5.5 | 0.06 |
| | Reclassified to non-PCB on day 375 | | | | | | | |
| 3 | Transformer #461 | 7,800 | mineral oil | | | | | |
| | Cycle 1, 1st part | | TCB mix | 85 | 0 | 25 | 650 | 26.00 |
| | Cycle 1, 2nd part | | TCB mix | 85 | 25 | 68 | 820 | 3.95 |
| | Cycle 1, 3rd part | | drain TCB mix | 85 | 68 | 164 | 1,140 | 3.33 |
| | Cycle 2, 1st part | | TCB mix | 85 | 164 | 175 | 68 | 6.18 |
| | Cycle 2, 2nd part | | TCB mix | 85 | 175 | 284 | 94 | 0.24 |
| | Cycle 3 | | L-305 | var to 55 | 284 | 376 | 11 | 0.12 |
| | Reclassified to non-PCB on day 376 | | | | | | | |
| 4 | Transformer #459 | 9,150 | mineral oil | | | | | |
| | Cycle 1, 1st part | | mineral oil | 85 | 0 | 115 | 392 | 3.41 |
| | Cycle 1, 2nd part | | mineral oil | 85 | 115 | 224 | 423 | 0.28 |
| | Cycle 2, 1st part | | L-305 | 85 | 224 | 255 | 27 | 0.87 |
| | Cycle 2, 2nd part | | L-305 | 85 | 255 | 290 | 30 | 0.09 |
| | Cycle 2, 3rd part | | L-305 | var to 55 | 290 | 381 | 37 | 0.08 |
| | Reclassified to non-PCB on day 381 | | | | | | | |
| 5 | Transformer #669 | 600,000 | askarel | | | | | |
| | Cycle 1, 1st part | | TCB mix | var (40) | 0 | 50 | 11,300 | 226.00 |
| | Cycle 1, 2nd part | | TCB mix | var (40) | 50 | 96 | 13,000 | 37.00 |
| | Cycle 2 | | TCB mix | var (15-40) | 96 | 161 | 680 | 10.50 |
| | Cycle 3 | | TCB mix | 55 | 161 | 225 | 830 | 13.00 |
| | Cycle 4 | | TCB mix | 85 | 225 | 294 | 390 | 5.65 |
| | Cycle 5, 1st part | | TCB mix | 85 | 294 | 360 | 453 | 6.86 |
| | Cycle 5, 2nd part | | TCB mix | 85 | 360 | 606 | 770 | 1.29 |
| | | Ongoing | | | | | | |
| A | Transformer #668 | 600,000 | askarel | | | | | |
| | Cycle 1, 1st part | | L-305 | var (40) | 0 | 28 | 8,650 | 309.00 |
| | Cycle 1, 2nd part | | L-305 | var (40) | 28 | 392 | 11,900 | 8.38 |
| | Cycle 2 | | L-305 | 85 | 392 | 539 | 1,700 | 11.60 |
| | | Ongoing | | | | | | |

TABLE 2

| Ex. No. | Transformer | Day Interval | Ave. PCB Elution Rate ppm/day* | Conc. TCB or TCB mix in L-305, wt. % | Ave. TCB or TCB mix Elution Rate ppm/day* |
|---|---|---|---|---|---|
| 1 | 667, cycle 5 | 336-344 | 6.06 | 2.70 | 3375 |
| | | 344-370 | 2.38 | 3.61 | 350 |
| | | 370-390 | 3.25 | 4.51 | 450 |
| | cycle 6 | 390-396 | 2.50 | 0.16 | 267 |
| | | 396-420 | 1.17 | 0.31 | 61.3 |
| | | 420-445 | 0.75 | 0.34 | 11.6 |
| | | 445-524 | 0.67 | — | — |
| | cycle 7 | 524-615 | 0.25 | 0.038 | 4.2 |
| 2 | 460, cycle 2 | 162-169 | 5.64 | 6.35 | 9071 |
| | | 169-185 | 0.49 | 7.33 | 613 |
| | | 185-220 | 0.18 | 7.72 | 111 |
| | | 220-283 | 0.12 | — | — |
| | cycle 3 | 283-375 | 0.06 | 0.378 | 41 |
| 3 | 461, cycle 3 | 284-376 | 0.12 | 4.72 | 513 |
| 4 | 459, cycle 2 | 290-381 | 0.08 | —*** | — |
| 5 | 669, cycle 5 | 296-350 | 3.91 | —** | —** |
| | | 350-400 | 3.93 | —** | —** |
| | | 400-606 | 1.76 | —** | —** |
| A | 668, cycle 1 | 0-28 | 309 | 1.48 | 526 |

TABLE 2-continued

| Ex. No. | Transformer | Day Interval | Ave. PCB Elution Rate ppm/day* | Conc. TCB or TCB mix in L-305, wt. % | Ave. TCB or TCB mix Elution Rate ppm/day* |
|---|---|---|---|---|---|
| | | 28–242 | 10.6 | 1.64 | 7.85 |
| | | 242–392 | 6.5 | — | — |
| | cycle 2 | 392–539 | 11.6 | — | — |

*L-305 basis
**Since TCB mix is still the coolant, there is no extracted TCB or TCB mix here.
***TCB or TCB mix were never used in this transformer.

EXAMPLE B

Since silicone oil is virtually insoluble in chlorobenzenes which, in turn, are only slightly soluble in the silicone oil, (e.g. TCB mix is soluble up to about 28 wt. % in L-305 at 25° C.), the permeation of the silicone oil into the interstices or pores containing the chlorobenzenes in order to leach the chlorobenzenes or PCB within the pores, must involve an interface. Without being bound by theory, it is hypothesized that two types of mechanisms prevail, i.e. capillary displacement or drainage in those cases where the pore is open at both ends and a diffusional mechanism in those cases, for example, where the pore is open only at one end wherein the chlorobenzene, e.g. PCB and/or TCB and/or TTCB diffuses into the silicone oil and the interface moves into the pore. The purpose of this example is to illustrate the rate of movement of the interface into a simulated pore.

This example utilized an apparatus comprising a glass capillary tube having a 2 mm. inside diameter extending downwardly from the bottom of a stoppered glass vessel. The lower end of the capillary was closed off and the upper end opened into the interior of the glass vessel. The capillary tube when two-thirds full held 0.125 cc. and the glass vessel held about 15 cc. The capillary tube was marked with a millimeter scale. In each of experiments #1–12, a lower phase as identified in Table 3 was introduced into the capillary tube to fill it about two-thirds full. An upper phase as identified in Table 3 was then placed in the upper third of the capillary tube in the glass vessel. The initial position of the interface between the upper and lower phases was measured and the position of the interface was measured on a daily basis to determine the rate of downward movement of the interface. The rates given in Table 3 for experiments #1–6 were determined over a 35 to 40 day period and the rates given in Table 3 for experiments #7–12 were measured over a 20 day period.

TABLE 3

| Rates of Silicone Penetration for Diffusion Alone | | | | |
|---|---|---|---|---|
| Expt. No. | Temp. °C. | Upper Phase | Lower Phase | Rate, mm/day |
| 1 | 60 | L-305 | 1,2,4-TCB | 0.307 |
| 2 | 60 | L-305 | TCB mix | 0.225 |
| 3 | 60 | L-305 | Askarel(1) | 0.113 |
| 4 | 60 | 10% TCB/ L-305(3) | 1,2,4-TCB | 0.222 |
| 5 | 60 | 5% TCB/ L-305(4) | Askarel | 0.059 |
| 6 | 60 | 10% TCB/ L-305(3) | Askarel | 0.020 |
| 7 | 40 | L-305 | TCB mix | 0.152 |
| 8 | 40 | L-305 | Askarel | 0.072 |
| 9 | 100 | L-305 | TCB mix | 0.229 |
| 10 | 100 | L-305 | Askarel | 0.111 |
| 11 | 40–100(2) | L-305 | TCB mix | 0.219 |
| 12 | 40–100 | L-305 | Askarel | 0.079 |

(1)60 wt. % PCB and 40 wt. % TCB
(2)40–100 means the temperature was alternated at 40° C. on one day and at 100° C. on the next day
(3)10 wt. % TCB in 90 wt. % L-305
(4)5 wt. % TCB in 95 wt. % L-305

It is noted that the ratio of the rate for TCB mix to the rate for Askarel was about 2 regardless of temperature (compare experiment #2 and #3 with #7 and #8 with #9 and #10). The data given in Table 3 also illustrates that the rate at 60° C. was about 1.5 times the rate at 40° C. and there appears to be no additional commensurate increase at 100° C. Table 3 also shows the rate of penetration of TCB into the silicone oil was greater than the rate of penetration of TCB mix which, in turn, was greater than the rate of penetration of askarel. The results of experiment #6 suggest that back diffusion of TCB from the upper phase back into the lower phase may be responsible for the very low rate of the diffusion found for experiment #6. Back diffusion in experiment #4 would not significantly effect the rate because the lower phase was about 100% TCB whereas in experiment #6 the lower phase contained only 40% TCB.

The first conclusion above, i.e., the fact that TCB mix was eluted twice as fast as Askarel by L-305 is the key finding behind the use of the L-305 preparatory leach (e.g., Cycle 2 of Example 2 and Cycle 5 of Example 1). While L-305 may elute Askarel itself slowly, once the latter is diluted with TCB mix, the TCB mix with its contained PCB can be eluted much faster. This permits the final L-305 leach to remove substantially all the TCB mix, and much of the PCB which the TCB mix has itself failed to leach, prior to the final silicone oil fill and reclassification to a non-PCB transformer.

The present invention is not limited to use in transformers but can be used in the case of any electrical induction apparatus using a dielectric coolant liquid including electromagnets, liquid cooled electric motors, and capacitors, e.g., ballasts employed in fluorescent lights.

What is claimed is:

1. A method for replacing a coolant containing PCB in an electrical induction apparatus having a vessel containing said coolant, an electrical winding and porous solid cellulosic electrical insulation immersed in said PCB-containing coolant with a substantially PCB-free high boiling dielectric permanent coolant into which any residual PCBs in the apparatus elute at no greater than a selected target rate, said solid porous electrical insulation initially being impregnated with said PCB-containing coolant, said method comprising the steps of:

(a) removing the major portion of said coolant contained in the vessel;

(b) filling said vessel with an interim dielectric cooling liquid substantially free of PCB, said cooling liquid being (i) miscible with said PCB-containing coolant, (ii) sufficiently low in viscosity to circulate within said vessel and penetrate the interstices of said porous solid electrical insulation, and (iii) capable of being readily separated from PCB;

(c) electrically operating said electrical induction apparatus to elute PCB contained in said coolant impregnated in said porous solid insulation therefrom into said interim dielectric cooling liquid;

(d) thereafter removing said interim dielectric cooling liquid containing said eluted PCB from said vessel;

(e) repeating the cycle of steps (b), (c) and (d), if the rate of elution of PCB into said interim dielectric cooling liquid after electrical operation pursuant to step (c) exceeds 5 times said selected target rate, a sufficient number of times until the rate of elution of PCB into said interim dielectric cooling liquid does not exceed 5 times said selected target rate;

(f) filling said vessel with a substantially PCB-free dielectric silicone oil as cooling liquid;

(g) electrically operating said electrical induction apparatus containing said PCB-free dielectric silicone oil cooling liquid to elute interim dielectric cooling liquid and additional PCB impregnated in said porous solid insulation therefrom into said dielectric silicone oil;

(h) thereafter removing said dielectric silicone oil containing said eluted PCB from said vessel;

(i) repeating the cycle of steps (f), (g) and (h), if the rate of elution of PCB into said dielectric silicone oil exceeds said selected target rate of elution, a sufficient number of times until the rate of elution of PCB into said dielectric silicone oil is less than said selected target rate of elution; and (j) refilling said vessel with a substantially PCB-free permanent dielectric cooling liquid.

2. Method as claimed in claim 1 wherein the cycle of steps (b), (c) and (d) is repeated as step (e) until the rate of elution of PCB into said interim dielectric cooling liquid is in the range of 1 to 3 times the selected target rate of elution into the coolant of an electrical apparatus rated as non-PCB.

3. Method as claimed in claim 1 wherein the cycle of steps (b), (c) and (d) is repeated as step (e) until the rate of elution of PCB into said interim dielectric cooling liquid is in the range of one to two times the selected target rates of elution into the coolant of an electrical apparatus rated as non-PCB.

4. Method as claimed in claim 3 wherein each step is continued for 30 to 120 days.

5. Method as claimed in claim 3 wherein, when carrying out step (d) of the previous cycle and step (b) of the next succeeding cycle, said interim cooling liquid is removed from the top of said vessel while fresh chilled interim dielectric cooling liquid is fed into the bottom of said vessel and while electrical operation of the apparatus is continued.

6. Method as claimed in claim 3 wherein, when carrying out step (h) of the previous cycle and step (f) of the next succeeding cycle, said dielectric silicone oil cooling liquid of the previous cycle is removed from the top of said vessel while fresh chilled dielectric silicone oil cooling liquid is fed into the bottom of said vessel and while electrical operation of the apparatus is continued.

7. Method as claimed in claim 3 wherein said vessel is provided with heat insulation in order to raise the temperature of the interim dielectric cooling liquid contained by it during each step (c) or to raise the temperature of the dielectric silicone oil cooling liquid contained by it during each step (g) while electrically operating said electrical induction apparatus.

8. Method as claimed in claim 3 wherein said interim dielectric cooling liquid in said vessel is heated during step (c) or said dielectric silicone oil cooling liquid in said vessel is heated during step (g) while electrically operating said electric induction apparatus.

9. Method as claimed in claim 3 wherein during step (c) said interim dielectric cooling liquid or during step (g) said dielectric silicone oil cooling liquid is removed from said vessel, heated and returned to said vessel while maintaining sufficient dielectric fluid in said vessel and electrically operating said electrical induction apparatus.

10. Method as claimed in claim 3 wherein said interim dielectric liquid is more volatile than said PCB and is separated from said PCB contained by distilling off said interim dielectric cooling liquid.

11. Method as claimed in claim 3 wherein said interim dielectric cooling liquid containing PCB eluted from said solid insulation is drawn off from said vessel as a slip stream during step (c) and fresh interim PCB-free dielectric cooling liquid substantially equivalent to the amount of PCB-containing interim dielectric fluid drawn off in said slip stream is added to said vessel.

12. Method as claimed in claim 3 wherein said dielectric silicone oil cooling liquid containing PCB eluted from said electrical apparatus is drawn off from said vessel as a slip stream during step (g) and fresh dielectric silicone oil cooling liquid substantially equivalent to the amount drawn off into said slip stream is added to said vessel.

13. Method as claimed in claim 3 wherein said vessel is flushed with a solvent for said PCB following step (a) and before step (b).

14. Method as claimed in claim 13 wherein said flushing solvent is the same liquid as said interim dielectric cooling liquid used in step (b).

15. Method as claimed in claim 3 wherein said vessel is flushed with dielectric silicone oil cooling liquid following step (h) and before refilling said vessel.

16. Method as claimed in any one of claims 1–15 wherein said interim dielectric cooling liquid is trichlorobenzene.

17. Method as claimed in any one of claims 1–15 wherein said interim dielectric cooling liquid is a mixture of trichlorobenzene and tetrachlorobenzene.

18. Method as claimed in any one of claims 1–15 wherein said interim dielectric cooling liquid is trichloroethylene.

19. Method as claimed in any one of claims 1–15 wherein said dielectric silcone oil cooling liquid is a poly(dimethylsiloxane) oil having a viscosity of about 50 centistokes at 25° C.

20. Method as claimed in any one of claims 1–15 wherein said substantially PCB-free permanent dielectric cooling liquid used in step (j) is a dielectric silicone oil.

21. Method as claimed in any one of claims 1–15 wherein the selected target rate of elution is 50 ppm after 90 days of electrical operation without change of coolant.

22. Method as claimed in any one of claims 1–15 wherein said dielectric silicone oil cooling liquid is a poly(dimethylsiloxane) oil having the formula:

$$(CH_3)_3SiO[(CH_3)_2SiO]_nSi(CH_3)_3$$

wherein n is of a value sufficient to provide a viscosity at 25° C. of 20 to 200 centistokes.

* * * * *